C. L. WELTNER.
ELECTRIC MOTOR.
APPLICATION FILED JUNE 21, 1921.
1,421,634.
Patented July 4, 1922.
2 SHEETS—SHEET 1.
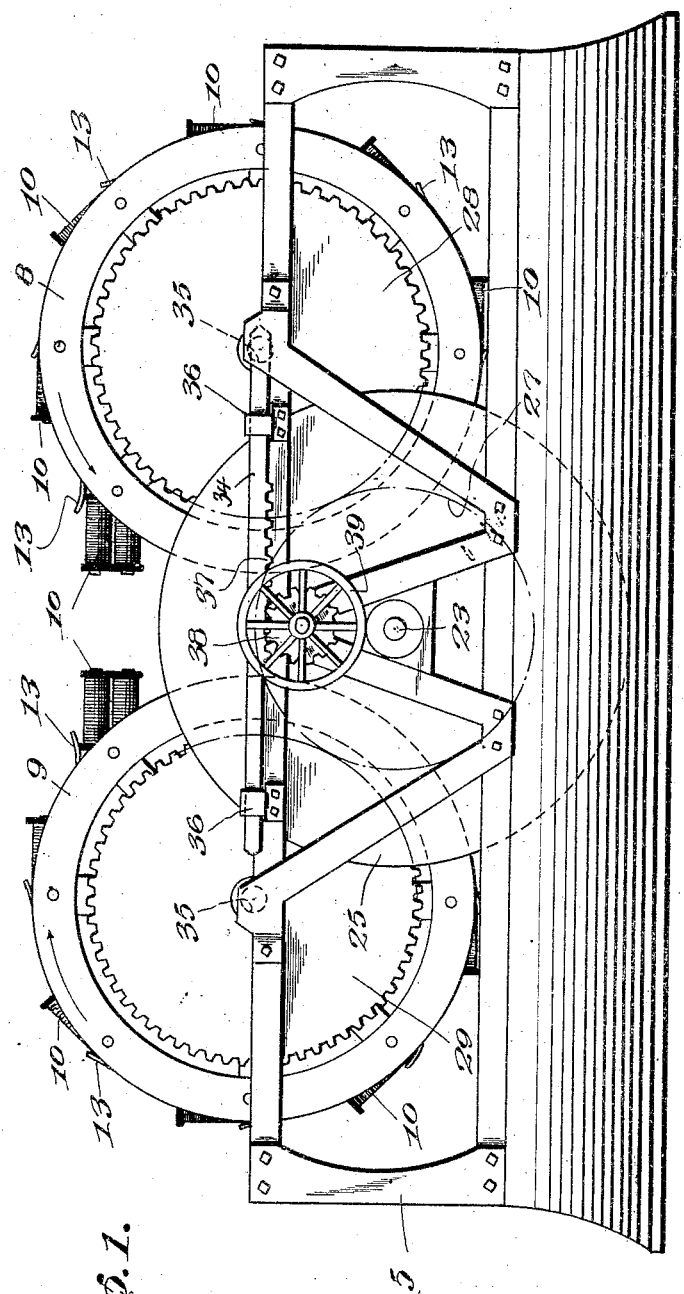
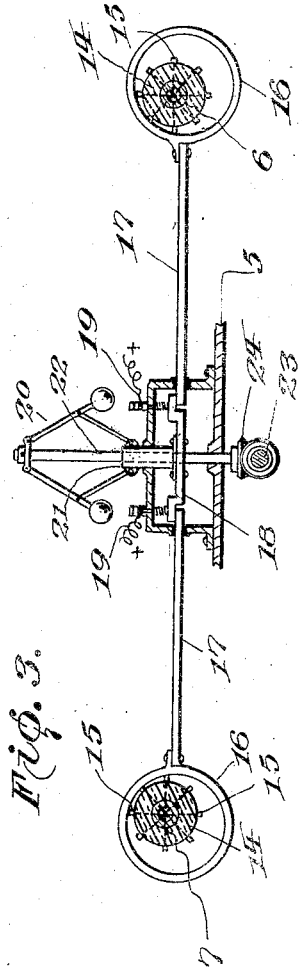
INVENTOR:
Corliss L. Weltner.
By
ATTORNEYS.

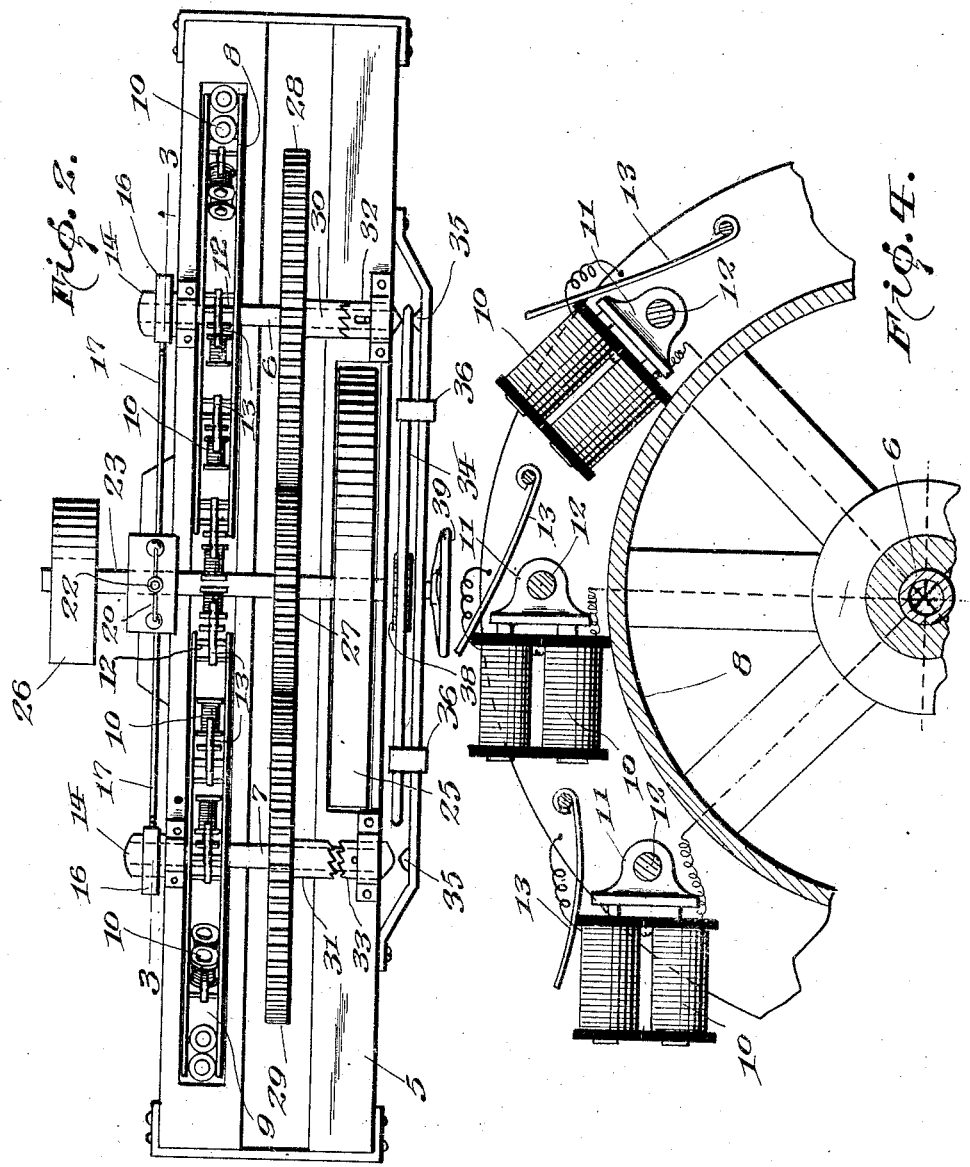

UNITED STATES PATENT OFFICE.

CORLISS L. WELTNER, OF LOONEYVILLE, WEST VIRGINIA.

ELECTRIC MOTOR.

1,421,634.  Specification of Letters Patent. Patented July 4, 1922.

Application filed June 21, 1921. Serial No. 479,357.

*To all whom it may concern:*

Be it known that I, CORLISS L. WELTNER, a citizen of the United States, residing at Looneyville, in the county of Roane and State of West Virginia, have invented new and useful Improvements in Electric Motors, of which the following is a specification.

This invention relates to motors which are operated by electric means, and its object is to provide a novel and improved motor consisting of a pair of wheels mounted on parallel shafts, and having their edges facing each other and carrying electro-magnets, which latter, by their mutual attraction, impart a rotary movement to the wheels.

The invention also has for its object to provide a novel means for controlling the energizing circuits of the magnets, and also to provide a means whereby the motion of either propelling wheel may be utilized.

With the objects stated in view, the invention consists in a combination and arrangement of parts to be hereinafter described and claimed, and in order that the same may be better understood, reference is had to the accompanying drawings forming a part of this specification.

In the drawings,

Figure 1 is an elevation of the motor;

Fig. 2 is a plan view thereof;

Fig. 3 is an elevation, partly in section showing a governor-controlled switch mechanism, and Fig. 4 is an enlarged detail view illustrating the method of mounting the electro-magnets.

Referring specifically to the drawings, 5 denotes a suitable supporting frame provided with bearings for two parallel and spaced shafts 6 and 7. On the shaft 6 is mounted a propelling wheel 8 and on the shaft 7 is mounted a propelling wheel 9. The two wheels are equipped with electro-magnets 10 so arranged that at certain times during the rotation of the wheels, the poles of the magnets of one wheel are opposite the poles of the magnets of the other wheel, whereby the mutual attraction between the magnets causes the wheels to rotate and thus impart motion to the shafts 5 and 6 to which said wheels are fastened.

Fig. 4 clearly illustrates the manner in which the magnets 10 are mounted on the wheels 8, it being understood that the magnets of the wheel 9 are mounted in the same manner. As shown, each magnet is carried by a base member 11 which is pivoted on a cross pin 12. The rim of the wheel is channeled to seat the magnets, and the pins 12 extend across the channel. One of the walls of the channel carries a spring 13 which is arranged to press against the magnet 11 to hold the same when not energized, substantially tangential with respect to the rim of the wheel, whereas when the magnets arrive in tractive position those of one wheel are in alinement with those of the other wheel.

The magnets 10 may be energized from any convenient source of electricity. The manner in which the current is led to the magnets will be presently described.

A circuit controller is provided whereby the magnets 10, one after the other are energized as they reach a position coinciding with the vertical center line of the wheels 8 and 9 at the top thereof. Assuming the wheels to be rotating as indicated by the arrows in Fig. 1, the magnets of the respective wheels, upon reaching the position just described, swing to come into axial alinement and they approach each other alined until they arrive at a position coinciding with the horizontal center line of the wheels, at which time they are nearest to each other. The magnets will be kept energized until they reach the last described position where the maximum tractive effect occurs, due to the proximity of the magnet poles. The current is now shut off and the magnets remain deenergized until they again reach the first described position. The power whereby the wheels are rotated is therefore applied only to those portions which are traveling toward each other, or through an angular distance of ninety degrees. The drawings show eight magnets on each wheel, and hence three magnets of each wheel are at all times operative.

The following means are provided for controlling the circuits of the magnets:

On the shaft 6 of the wheel 8 is mounted to turn with said shaft, a commutator disk 14 carrying contact points 15 at its periphery. These contact points are wired or otherwise electrically connected to the magnets 10 of the wheel 8, each point being connected to a magnet. The wires may run through the shaft and the spokes of the wheel as shown in Fig. 4. The disk 15 runs in a cylindrical shell 16 of conductive material, said shell being eccentrically arrayed relative to the disk, as shown in Fig. 3, and the relative diameters of these parts being such that the points 15 are in contact with the shell during a quarter revolution of the disk 14, or for the same angular distance the magnets are to be energized. It will also be noted that three of the points 15 are at all times in contact with the shell 16 to energize a corresponding number of magnets as hereinbefore described.

The controlling means for the magnets 10 of the wheel 9 are the same as that just described, and the parts have been given the same reference numerals in Fig. 3.

To the shells 16 are connected conductor bars 17 which extend toward each other and have their opposite ends positioned beneath a switch bar 18 provided with suitable circuit connections 19 with one side of a suitable current source. The other side of the current source, as well as the magnets 10, are grounded, the grounded arrangement of the magnets being shown in Figure 4. It will be understood of course, that the switch bar 18 must be insulated from its supporting means. The circuit connections are entirely immaterial to the invention, and they may be arranged in any suitable manner. The switch bar 18 is governor-controlled, so that if the wheels 8 and 9 should attain an excessive speed, said bar will move away from the bars 17 to break the energizing circuit of the magnets. An ordinary centrifugal governor 20 is shown in Fig. 3 which operates a vertically slidable sleeve 21 carrying the bar 18. The spindle 22 of the governor derives motion from a shaft 23 driven by the wheels 8 and 9, a bevel gearing 24 being provided for transmitting the motion of said shaft to the governor spindle. The shaft 23 is provided with a fly-wheel 25 and a pulley 26 for transmitting the motion of the shaft.

The shaft 23 is designed to be driven from either one of the shafts 6 and 7, and for this purpose it is provided with a spur gear 27 which is in mesh with a spur gear 28 on the shaft 6, and a spur gear 29 on the shaft 7. The gears 28 and 29 are loose on their shafts, and a clutch mechanism is provided for locking either to the shaft to turn therewith, and thus transmit motion to the driven shaft 23 through the gear 27. In this manner, the shaft 23 may be driven in either direction, or it may be disconnected entirely.

The clutch mechanism just referred to consists of clutch members 30 and 31 connected to the gears 28 and 29 to turn therewith, and cooperating clutch members 32 and 33 slidably mounted on the shafts 6 and 7 and turning therewith. It will therefore be seen that when the clutch members 30 and 32 are engaged, the shaft 6, through the gears 28 and 27 drives the shaft 23, whereas when the clutch members 31 and 33 are engaged, the shaft 7, through the gears 29 and 27 drives the shaft 23.

The clutch members 32 and 33 are alternately operable by a longitudinally slidable bar 34 adapted to have its ends come between the outer ends of said members, and stationary lugs 35 located opposite said ends and spaced therefrom. Thus when the bar 34 was shifted to the right as shown in Fig. 2, its corresponding end was wedged between the end of the clutch member 32 and the opposite lug 35, with the result that said clutch member was advanced into engagement with the clutch member 30. Upon sliding the bar 34 over to the left it engages the clutch member 33 with the clutch member 31. In its intermediate position, the bar 30 is clear of both lugs 35, and both clutches are in neutral position, so that now no motion is transmitted to the shaft 23.

The bar 34 is supported in suitable guides 36, and it is provided with rack teeth 37 for engagement by a pinion 38, whereby it is operated, said pinion being provided with a hand wheel or other suitable actuating means 39.

I claim:

1. An electric motor comprising a pair of parallel shafts, wheels carried by said shafts and having their rims facing each other, electro-magnets carried by said wheel rims and having their poles so positioned that the poles of the magnets of one wheel face the pole of the magnets of the other wheel during that portion of the travel of the wheels when the magnets thereof are approaching each other, and means for energizing the magnets during the period they approach each other.

2. An electric motor comprising a pair of parallel shafts, wheels carried by said shafts and having their rims facing each other, electro-magnets carried by said wheel rims and having their poles so positioned that the poles of the magnets of one wheel face the poles of the magnets of the other wheel during that portion of the travel of the wheels when the magnets thereof are approaching each other, and means for energizing the magnets one after the other when they arrive at a position where they approach each other and maintaining such energization until they recede.

3. An electric motor comprising a pair of parallel shafts, wheels carried by said shafts and having their rims facing each other, electro-magnets pivotally carried by said wheel rims, springs for maintaining a tangential position of the magnets with respect to the rims, said magnets having their poles so positioned that the poles of the magnets of one wheel face the poles of the magnets of the other wheel during that portion of the travel of the wheels when the magnets are approaching each other, the magnets of the respective wheels being also free to swing into axial alinement at this time, and means for energizing the magnets during the period they are approaching each other.

4. An electric motor comprising a pair of parallel shafts, wheels carried by said shafts and having their rims facing each other, electro-magnets carried by said wheel rims and having their poles so positioned that the poles of the magnets of one wheel face the poles of the magnets of the other wheel during that portion of the travel of the wheels when the magnets thereof are approaching each other, means for energizing the magnets during the period they approach each other, gears loose on the shafts, a driven shaft having a drive gear which is in mesh with the first mentioned gears, and means for establishing driving connections between the first mentioned gears and their shafts alternately.

5. An electric motor comprising a pair of parallel shafts, wheels carried by said shafts and having their rims facing each other, electro-magnets carried by said wheel rims and having their poles so positioned that the poles of the magnets of one wheel face the poles of the magnets of other wheel during that portion of the travel of the wheels when the magnets thereof are approaching each other, means for energizing the magnets during the period they approach each other, and a governor-controlled switch mechanism associated with said means.

In testimony whereof I affix my signature.

CORLISS L. WELTNER.